Sept. 2, 1958 R. S. KOFFORD 2,850,326
FOGGER FOR COOLING POULTRY
Filed Dec. 6, 1956

INVENTOR.
REED S. KOFFORD
BY
ATTORNEY

United States Patent Office 2,850,326
Patented Sept. 2, 1958

2,850,326
FOGGER FOR COOLING POULTRY
Reed S. Kofford, Van Nuys, Calif.
Application December 6, 1956, Serial No. 626,639
6 Claims. (Cl. 299—127)

This invention relates to a fogger. While my fogger is capable of substantially any use, it is particularly designed and adapted for use in creating a fog for the purpose of cooling poultry and similar animals.

It is well known that poultry and other animals which are kept in cages or confined areas are particularly susceptible to hot weather and many of them perish on such occasions. Various means have been devised to keep the animals cool, including various types of foggers. Such foggers cause a jet of water to be converted into a fine mist which diffuses into the air above the animals so that it falls upon the bodies of the animals and cools them. Such a fogger acts to cool the air surrounding the animal and also the body of the animal through evaporation of the fine particles of water which come to rest upon the body of the animal.

It is an object of my invention to provide an improved fogger of the class described which is simple and economical to construct, install and maintain.

My fogger is preferably formed of three parts, all of which are easily assembled and manufactured and easily disassembled for cleaning purposes. My fogger is also easily and quickly adjustable by the user after installation for maximum fogging action.

It is accordingly an object of my invention to provide a fogger having all of the advantages and benefits of the structure set forth above. My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Figure 1:
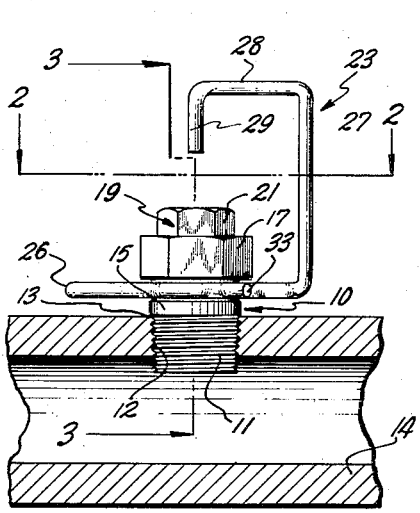
Fig. 1 is a side elevational view of my fogger in use, with the water pipe shown in section.
Figures 2, 3:
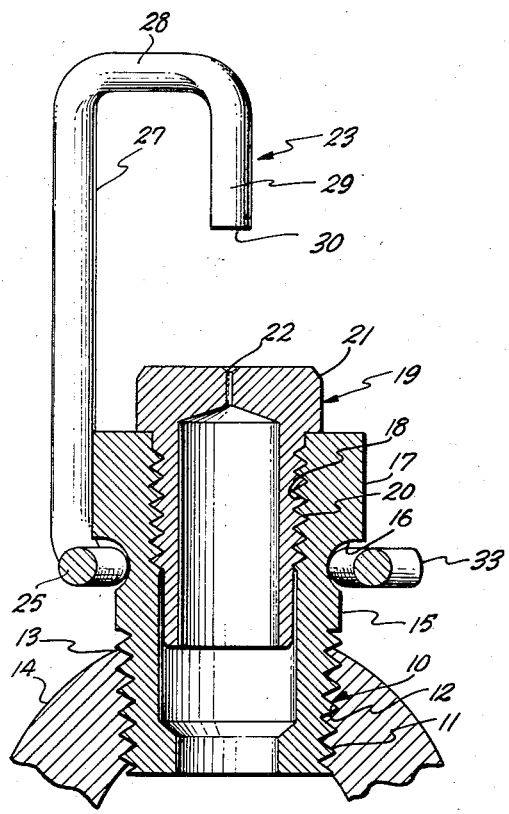
Fig. 2 is a top plan view of my fogger taken along line 2—2 of Fig. 1, with the water pipe being omitted.
Fig. 3 is a sectional view taken along line 3—3 of Fig. 1.
Figure 4:
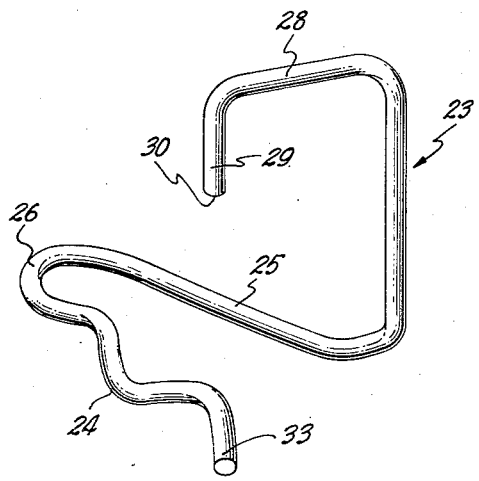
Fig. 4 is a perspective view of the spring clip.

A preferred embodiment which has been selected to illustrate my invention comprises a tubular fitting 10. The outside of one end of the fitting 10 is cylindrical and is provided with external screw threading 11, which is adapted to engage the complementary internal screw threading 12 which is tapped into an opening 13 which extends into a water pipe 14. The water pipe 14 may be connected to a conventional source of water pressure such as city water pressure or the like.

The fitting 10 is provided with a smooth substantially cylindrical portion 15, which is disposed directly adjacent to the screw threading 11, separating it from an annular groove 16, which extends around the midportion of the fitting 10. The annular groove 16 is slightly out of round with respect to the longitudinal axis of the fitting 10, for reasons which later appear.

The end of the fitting 10 remote from the external screw threading 11 is provided with a hexagonal portion 17 on the outside thereof which is larger in circumference than the remainder of the fitting 10. The inside of the fitting 10 is hollow. The end thereof adjacent the hexagonal portion 17 is provided with internal screw threading 18.

A valve member 19 is provided with external screw threading 20 which is complementary to and is adapted to engage the internal screw threading 18 of the fitting 10. One end of the valve member 19 is provided with a hexagonal portion 21, which is larger in circumference than the remainder of the valve member 19.

The valve member 19 is hollow, being open at one end thereof and completely closed at the end thereof adjacent the hexagonal portion 21 except for a small substantially centrally disposed opening 22.

In use, the valve member 19 is mounted with the major portion thereof disposed within the fitting 10 and the hexagonal portions 17 and 21 disposed adjacent each other. The closed end of the valve member 19 acts as a closure for the end of the fitting 10 remote from the water pipe 14.

A spring clip 23 is preferably formed from a single length of wire having a circular cross section and which is so formed as to have a first free end 33, adjacent which is a curved portion 24 which may be described as an S-curve and which is adapted to fit within the annular groove 16 beneath the hexagonal portion 17. The clip 23 has a straight portion 25 which is adapted to fit within the annular groove 16 on the opposite side of the fitting 10 from the curved portion 24. These portions 24 and 25, extend substantially transversely with respect to the fitting 10 and valve member 19. The portions 24 and 25 are integral parts of the clip 23 and are joined by a loop 26, so that the portions 24 and 25 are normally resiliently held within the groove 16 by spring tension. They can be moved slightly away from each other when the clip 23 is being attached to or detached from the fitting 10.

The end of the straight portion 25 remote from the loop 26 is slightly curved. Extending at substantially a right angle therefrom is a parallel arm 27. The parallel arm 27 extends substantially parallel to the longitudinal axis of the fitting 10 and terminates in a transverse arm 28, which extends at substantially a right angle from the end of the parallel arm to a point adjacent the longitudinal axis of the fitting 10. The transvesre arm 28 terminates in a reverse arm 29, which extends at substantially a right angle from the transverse arm 28 toward the fitting 10.

The clip 23 has a spray end 30 which is disposed at the end of the reverse arm 29 and which is spaced from, but aligned with the opening 22 in the valve member 19. All of the portions and arms described may be formed as shown as parts of a single length of wire which is bent upon itself to form the clip 23.

In use, my fogger is assembled and mounted in the manner shown in the drawings. Water under pressure enters the hollow fitting 10 and passes into the hollow interior of the valve member 19. Because of the pressure of the water supply and the small size of the opening 22, a thin jet of water will be ejected from the opening 19 along the line of the longitudinal axis of the fitting 10. This jet of water strikes the spray end 30 of the clip 23 and is diffused or fogged into a fine spray or mist or particles and aerosols of water.

It will be noted that, in order for maximum fogging action to take place, the alignment between the opening 22 and the spray end 30 is somewhat critical. It is accordingly considered desirable to provide some means of adjustment which is available to the user in order to assure proper fogging action. To accomplish this, the groove 16 is, as previously set forth above, made slightly out of round with respect to the longitudinal axis of the fitting 10. The clip 23 may accordingly be rotated around the groove 16 in order to accomplish precise adjustment of the spray end 30 with respect to the opening 22.

It will be noted that the clip 23 may be easily attached to and detached from the groove 16 by manual movement of the free end 33 and the curved end of the straight portion 25 away from each other. This flexes the loop 26 sufficiently to release the clip from the groove 16. The valve member 19 may then be removed from the fitting 10 for replacement or cleaning purposes.

It will be noted that, since the connection between the valve member 19 and fitting 10 is a brass to brass connection, there will be no rusting or corrosion which will tend to prevent their easy separation from each other.

It may also be noted that my fogger is preferably disposed so that the longitudinal axis of the fitting 10 extends in a vertical direction. With the fogger mounted above the water pipe 14, the opening 22 will not become clogged by particles of sand or gravel which are found in the water supply.

I claim:

1. A fogger comprising an elongated substantially tubular fitting having external screw threading adjacent one end thereof and an enlarged portion adjacent the opposite end thereof, an annular groove extending around the outside of said fitting, said groove being disposed between said screw threaded portion and said enlarged portion, said groove being slightly out of round with respect to the longitudinal axis of said fitting, said fitting having internal screw threading adjacent the end thereof remote from said external screw threading, an elongated substantially tubular valve member having external screw threading adapted to engage the internal screw threading of said fitting, one end of said valve member being open and the opposite end being closed except for a small centrally disposed opening, the closed end of said valve member having an enlargement on the outside thereof, said valve member adapted to be screw threadedly mounted in said fitting, with said enlargements disposed adjacent each other and the closed end of said valve member sealing off the internally screw threaded end of said fitting, the externally screw threaded end of said fitting adapted to be attached to a source of water supply, a spring clip removably mounted on the outside of said fitting, said spring clip having portions adapted to fit within said groove on the opposite sides of said fitting, said portions being joined by a loop, said loop providing spring tension normally urging said portions into said groove, said clip having a parallel portion extending substantially parallel to the longitudinal axis of said fitting, said clip having a transverse portion extending at substantially a right angle from the end of said parallel portion to a point adjacent the longitudinal axis of said fitting, said clip having a reverse arm extending at substantially a right angle from the end of said transverse portion toward said fitting, said clip having a spray end comprising the end of said reverse arm and the free end of said clip, said spray end being substantially aligned with the opening in said valve member, the alignment of said spray end with respect to said opening being adjustable by rotation of said clip with respect to said fitting, said spray end being adapted to diffuse water ejected thereagainst through the opening in said valve member.

2. A fogger comprising an elongated substantially tubular fitting have external screw threading adjacent one end thereof and an enlarged portion adjacent the opposite end thereof, an annular groove extending around the outside of said fitting, said groove being disposed between said screw threaded portion and said enlarged portion, said groove being slightly out of round with respect to the longitudinal axis of said fitting, said fitting having internal screw threading adjacent the end thereof remote from said external screw threading, an elongated substantially tubular valve member having external screw threading adapted to engage the internal screw threading of said fitting, one end of said valve member being open and the opposite end being closed except for a small centrally disposed opening, the closed end of said valve member having an enlargement on the outside thereof, said valve member adapted to be screw threadedly mounted in said fitting, with said enlargements disposed adjacent each other and the closed end of said valve member sealing off the internally screw threaded end of said fitting, the externally screw threaded end of said fitting adapted to be attached to a source of water supply, a spring clip removably mounted on the outside of said fitting, said spring clip having portions adapted to fit within said groove on opposite sides of said fitting, said portions being held on said fitting by the resilience of said clip, said clip having a free spray end spaced from and substantially aligned with the opening in said valve member, the precise alignment of said spray end with respect to said opening being adjustable by rotation of said clip with respect to said fitting, said spray end being adapted to diffuse water ejected thereagainst through the opening in said valve member.

3. A fogger comprising a tubular fitting having external screw threading adjacent one end thereof, an annular groove extending around the outside of said fitting, said groove being slightly out of round with respect to the longitudinal axis of said fitting, said fitting having internal screw threading adjacent the end thereof remote from said external screw threading, a tubular valve member having external screw threading adapted to engage the internal screw threading of said fitting, one end of said valve member being open and the opposite end being closed except for a small centrally disposed opening, said valve member adapted to be screw threadedly mounted in said fitting, with the closed end of said valve member sealing off the internally screw threaded end of said fitting, the externally screw threaded end of said fitting adapted to be attached to a source of water supply, a spring clip removably mounted on the outside of said fitting, said spring clip having portions adapted to fit within said groove on opposite sides of said fitting, said portions being held therein by the resilience of said clip, said clip having a free spray end spaced from and substantially aligned with the opening in said valve member, the precise alignment of said spray end being adjustable by rotation of said clip with respect to said fitting, said spray end being adapted to diffuse water ejected thereagainst through the opening in said valve member.

4. A fogger comprising a tubular fitting having means adjacent one end thereof for attachment of said fitting to a source of water supply, the opposite end of said fitting being sealed off except for a small opening, said fitting having an annular groove extending therearound, said groove being slightly out of round with respect to the longitudinal axis of said fitting, a clip mounted on the outside of said fitting, said clip having portions adapted to fit within said groove on the opposite sides of said fitting, said clip having a free spray end in substantial alignment with and spaced from said opening, the precise alignment of said spray end with respect to said opening being adjustable by rotation of said clip with respect to said fitting, said spray end being adapted to diffuse water ejected thereagainst through the opening.

5. A fogger comprising a fitting, said fitting having an opening through which a jet of water is adapted to be ejected, said fitting having an outer surface which is slightly offset concentrically with respect to the longitudinal axis of said fitting, spray means rotatably mounted on said surface, said spray means having a portion adapted to be spaced from and in substantial alignment with said opening, the positioning of said portion with respect to said opening being adjustable by rotation of said spray means around said fitting.

6. A fogger comprising a tubular fitting having means adjacent one end thereof for attachment of said fitting to a source of water supply, the opposite end of said fitting being sealed off except for a small opening, said fitting having an annular groove extending therearound, a spring clip rotatably and removably mounted on the outside of said fitting, said clip having an S-curve adjacent one end thereof, followed by a loop and a straight portion, said straight portion extending substantially parallel to said S-curve and being spaced therefrom, said S-curve, loop and straight portion all being disposed in substantially the same plane, said S-curve, loop and straight portion comprising resilient means for rotatably and removably mounting said clip on said fitting, said loop permitting said S-curve and straight portion to be spread apart from each other to fit in said groove on opposite sides of said fitting, said clip being held on said fitting by its own resilience, and means carried by the opposite end of said clip disposed in alignment with the opening in said fitting and adapted to diffuse a stream of water ejected thereagainst through said opening.

References Cited in the file of this patent

UNITED STATES PATENTS

| | | |
|---|---|---|
| 2,701,165 | Bete et al. | Feb. 1, 1955 |

FOREIGN PATENTS

| | | |
|---|---|---|
| 12,551 | Great Britain | June 28, 1894 |
| 362,173 | Germany | Oct. 23, 1922 |
| 800,615 | Germany | Nov. 23, 1950 |
| 671,095 | Great Britain | Apr. 30, 1952 |